US012387176B1

(12) United States Patent
Bradford

(10) Patent No.: US 12,387,176 B1
(45) Date of Patent: Aug. 12, 2025

(54) SYSTEM AND METHOD FOR FACILITATING TEMPORARY EMPLOYMENT IN SECURE ENVIRONMENTS

(71) Applicant: Ramsie Bradford, San Antonio, TX (US)

(72) Inventor: Ramsie Bradford, San Antonio, TX (US)

(*) Notice: Subject to any disclaimer, the term of this patent is extended or adjusted under 35 U.S.C. 154(b) by 231 days.

(21) Appl. No.: 16/874,598

(22) Filed: May 14, 2020

(51) Int. Cl.
*G06Q 10/1053* (2023.01)
*G06F 21/32* (2013.01)
*G07C 9/37* (2020.01)

(52) U.S. Cl.
CPC ......... *G06Q 10/1053* (2013.01); *G06F 21/32* (2013.01); *G07C 9/37* (2020.01)

(58) Field of Classification Search
CPC ........ G06Q 10/1053; G06F 21/32; G07C 9/37
See application file for complete search history.

(56) References Cited

U.S. PATENT DOCUMENTS

| | | | | |
|---|---|---|---|---|
| 5,884,270 A * | 3/1999 | Walker | ................. | H04L 9/3271 |
| | | | | 379/93.12 |
| 8,145,575 B1 * | 3/2012 | Johnson | ............ | G06Q 10/1053 |
| | | | | 705/320 |
| 8,595,148 B1 * | 11/2013 | Borgen | ............... | G06Q 10/105 |
| | | | | 705/321 |
| 8,682,806 B1 * | 3/2014 | Cate | ................ | G06Q 10/1053 |
| | | | | 705/320 |
| 8,704,682 B1 * | 4/2014 | Chau | ................ | G01C 21/3453 |
| | | | | 340/995.13 |
| 9,043,799 B1 * | 5/2015 | Martin | .................... | G06F 9/46 |
| | | | | 718/104 |
| 9,064,285 B1 * | 6/2015 | Nathoo | ............... | G06Q 40/125 |
| 9,569,416 B1 * | 2/2017 | Martin | ................... | G06F 9/451 |
| 9,832,193 B2 * | 11/2017 | Amaladoss | ............ | H04L 67/14 |
| 11,086,845 B1 * | 8/2021 | Shah | .................... | G06F 16/219 |
| 11,341,222 B1 * | 5/2022 | Caffey | ................. | H04W 12/06 |
| 2002/0123921 A1 * | 9/2002 | Frazier | ........... | G06Q 10/063112 |
| | | | | 705/7.14 |
| 2002/0156674 A1 * | 10/2002 | Okamoto | ........... | G06Q 10/1053 |
| | | | | 705/321 |
| 2003/0050816 A1 * | 3/2003 | Givens | ........... | G06Q 10/063112 |
| | | | | 705/7.14 |
| 2003/0163709 A1 * | 8/2003 | Milgramm | .............. | G07C 9/37 |
| | | | | 713/186 |
| 2003/0204425 A1 * | 10/2003 | Kennedy | ............... | G06Q 10/10 |
| | | | | 715/825 |
| 2004/0015371 A1 * | 1/2004 | Thomas | ................. | G06Q 10/10 |
| | | | | 705/321 |
| 2004/0024694 A1 * | 2/2004 | Lawrence | ............ | G06Q 40/025 |
| | | | | 705/38 |
| 2004/0044538 A1 * | 3/2004 | Mauzy | .............. | G06Q 10/1053 |
| | | | | 705/321 |

(Continued)

*Primary Examiner* — Aravind K Moorthy

(57) ABSTRACT

A system and method for facilitating temporary employment in secure environments includes a computer server in communication with an open, but prequalified, employee base and an open employer base. The computer server is adapted to economically and efficiently match an employer in need with a readily available temporary employee selected from a pool of prequalified candidate employees. Additionally, the computer server is adapter to authenticate the identity of the selected candidate on arrival at the employer location.

6 Claims, 2 Drawing Sheets

(56) References Cited

U.S. PATENT DOCUMENTS

| | | | |
|---|---|---|---|
| 2004/0107112 A1* | 6/2004 | Cotter | G06Q 30/02 |
| | | | 705/321 |
| 2004/0143469 A1* | 7/2004 | Lutz | G06Q 10/10 |
| | | | 705/321 |
| 2004/0177095 A1* | 9/2004 | West | G06Q 99/00 |
| 2004/0268125 A1* | 12/2004 | Clark | G06F 21/6218 |
| | | | 726/4 |
| 2005/0027983 A1* | 2/2005 | Klawon | G06F 21/31 |
| | | | 713/168 |
| 2005/0206501 A1* | 9/2005 | Farhat | G07C 9/257 |
| | | | 340/5.82 |
| 2005/0240431 A1* | 10/2005 | Cotter | G06Q 30/02 |
| | | | 705/321 |
| 2005/0256744 A1* | 11/2005 | Rohde | G06Q 10/00 |
| | | | 705/2 |
| 2006/0018520 A1* | 1/2006 | Holloran | G06Q 10/10 |
| | | | 382/116 |
| 2006/0026069 A1* | 2/2006 | Mazurkiewicz | G06Q 30/02 |
| | | | 705/14.42 |
| 2006/0229896 A1* | 10/2006 | Rosen | G06Q 10/1053 |
| | | | 705/321 |
| 2007/0078793 A1* | 4/2007 | Dearing | G06Q 10/08 |
| | | | 705/401 |
| 2007/0129966 A1* | 6/2007 | Walker | G06Q 10/1053 |
| | | | 705/321 |
| 2008/0183486 A1* | 7/2008 | Baumgarten | G06Q 30/02 |
| | | | 705/321 |
| 2008/0183600 A1* | 7/2008 | Bowser | G06Q 30/0283 |
| | | | 705/28 |
| 2009/0049095 A1* | 2/2009 | Simon | G06Q 10/06 |
| 2010/0046806 A1* | 2/2010 | Baughman | G06F 21/316 |
| | | | 345/619 |
| 2011/0010276 A1* | 1/2011 | Bowser | G06Q 10/0875 |
| | | | 705/29 |
| 2011/0112977 A1* | 5/2011 | Baumgarten | G06Q 10/00 |
| | | | 705/321 |
| 2011/0208664 A1* | 8/2011 | Rahman | G06Q 30/0282 |
| | | | 705/347 |
| 2011/0313941 A1* | 12/2011 | Rahman | G06Q 10/1053 |
| | | | 705/321 |
| 2012/0023030 A1* | 1/2012 | Jeffries | G06Q 10/1053 |
| | | | 705/319 |
| 2013/0013489 A1* | 1/2013 | Kremen | G06Q 50/01 |
| | | | 705/38 |
| 2013/0024105 A1* | 1/2013 | Thomas | H04W 4/023 |
| | | | 701/410 |
| 2013/0097093 A1* | 4/2013 | Kolber | G06Q 10/1053 |
| | | | 705/321 |
| 2013/0104197 A1* | 4/2013 | Nandakumar | G06F 21/40 |
| | | | 726/4 |
| 2014/0114871 A1* | 4/2014 | Jain | G06Q 10/1053 |
| | | | 705/321 |
| 2014/0152424 A1* | 6/2014 | Steven | G07C 9/37 |
| | | | 340/5.82 |
| 2014/0164271 A1* | 6/2014 | Forman | G06Q 10/1053 |
| | | | 705/321 |
| 2014/0266604 A1* | 9/2014 | Masood | H04N 23/20 |
| | | | 340/5.83 |
| 2014/0294257 A1* | 10/2014 | Tussy | G06Q 10/00 |
| | | | 382/118 |
| 2014/0357295 A1* | 12/2014 | Skomra | G07C 5/008 |
| | | | 455/456.1 |
| 2015/0095077 A1* | 4/2015 | Ruffolo | G06Q 40/125 |
| | | | 705/32 |
| 2015/0112842 A1* | 4/2015 | Sieger | G06Q 30/0627 |
| | | | 705/26.63 |
| 2015/0213413 A1* | 7/2015 | Faron | G06Q 10/1053 |
| | | | 705/321 |
| 2015/0233733 A1* | 8/2015 | Parks, III | G06Q 10/10 |
| | | | 340/870.02 |
| 2015/0278960 A1* | 10/2015 | Moore | H04L 67/306 |
| | | | 707/769 |
| 2017/0004481 A1* | 1/2017 | Slusser | G06Q 20/12 |
| 2017/0069148 A1* | 3/2017 | Gilbertson | G07C 9/257 |
| 2017/0147984 A1* | 5/2017 | Zoia | G06F 16/9535 |
| 2017/0154312 A1* | 6/2017 | Wilson | G06Q 10/1053 |
| 2017/0228697 A1* | 8/2017 | Brdiczka | G06Q 10/1053 |
| 2017/0301161 A1* | 10/2017 | Sugishita | G06F 21/32 |
| 2018/0241751 A1* | 8/2018 | Kruse | H04L 63/102 |
| 2018/0308061 A1* | 10/2018 | Al Jadda | G06Q 10/10 |
| 2018/0330302 A1* | 11/2018 | Peterson | G06Q 10/06398 |
| 2018/0349854 A1* | 12/2018 | Wigand | G06F 3/04886 |
| 2018/0357644 A1* | 12/2018 | Tabe | G06V 40/1365 |
| 2019/0027254 A1* | 1/2019 | Li | G16H 50/30 |
| 2019/0079994 A1* | 3/2019 | Ma | G06F 16/2379 |
| 2019/0102528 A1* | 4/2019 | Beacham | G06V 40/171 |
| 2019/0102743 A1* | 4/2019 | Cirrincione | G06F 16/29 |
| 2019/0138996 A1* | 5/2019 | Salvi | G06F 40/284 |
| 2019/0246083 A1* | 8/2019 | Tripathi | G06T 3/0093 |
| 2019/0272487 A1* | 9/2019 | Theus | G06Q 10/06311 |
| 2019/0272640 A1* | 9/2019 | Sugahara | G06N 20/00 |
| 2019/0295040 A1* | 9/2019 | Clines | G06Q 10/1053 |
| 2019/0332754 A1* | 10/2019 | Andersen | G06F 21/35 |
| 2020/0005416 A1* | 1/2020 | Wade | G06Q 10/105 |
| 2020/0143612 A1* | 5/2020 | Nakao | G07C 9/38 |
| 2020/0202304 A1* | 6/2020 | Maltese | G06Q 10/1053 |
| 2020/0327507 A1* | 10/2020 | Paschalidis | G06Q 10/1091 |
| 2020/0349374 A1* | 11/2020 | Morzhakov | G06V 10/993 |
| 2020/0374287 A1* | 11/2020 | Bowie | H04W 12/06 |
| 2020/0387872 A1* | 12/2020 | Zhou | G06Q 50/01 |
| 2021/0005317 A1* | 1/2021 | Neumann | G16H 50/20 |
| 2021/0326184 A1* | 10/2021 | Muraleedharan | G06F 21/53 |

\* cited by examiner

SYSTEM AND METHOD FOR FACILITATING TEMPORARY EMPLOYMENT IN SECURE ENVIRONMENTS

FIELD OF THE INVENTION

The present invention relates to employment services. More particularly, the invention relates to a system and method for facilitating temporary employment in secure environments, whereby an employer in need may be economically and efficiently, and, moreover, securely, matched with a readily available temporary employee selected from a pool of prequalified candidate employees.

BACKGROUND OF THE INVENTION

It is projected that by the year 2030 there will be a 55% increase in the U.S. population aged 65 years or older. Notably, this demographic consumes double or more healthcare services than does younger patients, yet there is already a healthcare workforce shortage with vacancy rates up to 20%. With the increase in the aging population, this shortage is only expected to worsen. Although many factors contribute to the shortage, one factor in particular is burnout among healthcare professionals due to long term exhaustion and diminished interest in the work context. Unfortunately, the end result is further decrease in wellbeing among healthcare staff members and, ultimately, a decrease in quality of care provided.

Applicant has discovered that burnout in general can be retarded by enabling workers to have more control over their work schedules and time off. This flexibility, however, has heretofore not been available to the healthcare industry. In addition to the persistent and growing problem of staff shortages, the use of temporary employees—especially on short term notice or a per shift basis is made virtually impossible by the need for verifiably credentialed employees. As a result, there is a strong need to allow an employer in need to be economically and efficiently, and, moreover, securely, matched with a readily available temporary employee selected from a pool of prequalified candidate employees.

It is therefore an overriding object of the present invention to provide a system and method for facilitating temporary employment in secure environments, whereby such credentialed workers as, for example, include physicians, physician assistants, medical radiological technologists, non-certified radiologic technicians, respiratory care practitioners, medical physicists, perfusionists, pharmacists, pharmacy technicians, and the like, may readily participate in the temporary employee market.

SUMMARY OF THE INVENTION

In accordance with the foregoing objects, the present invention—a system and method for facilitating temporary employment in secure environments—generally comprises a computer server located at a site associated with a facilitator of temporary employment, and which is adapted to utilize various communication channels to bring together a prequalified pool of candidate employees and set of employers in particular need, from time-to-time of such temporary employees as possess credentials for which the employees are prequalified. Each candidate employee is required to have only a minimal contractual relationship with the facilitator, but must provide proof of professional credentials, including training and, as may be required, professional or other required licensing or the like. Additionally, an employee user is also required to submit to the collection by the facilitator of one or more biometric markers.

In a critical aspect of the present invention, the system and method for facilitating temporary employment enables the employer to positively authenticate the identity of a selected employee upon arrival of that employee at the employer's location utilizing collected biometric markers. To this end, the computer server is adapted to receive biometric data remotely obtained by the employer, to compare the received biometric data with biometric data previously obtained and validated by the facilitator, and to then communicate authentication or rejection to the employer.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
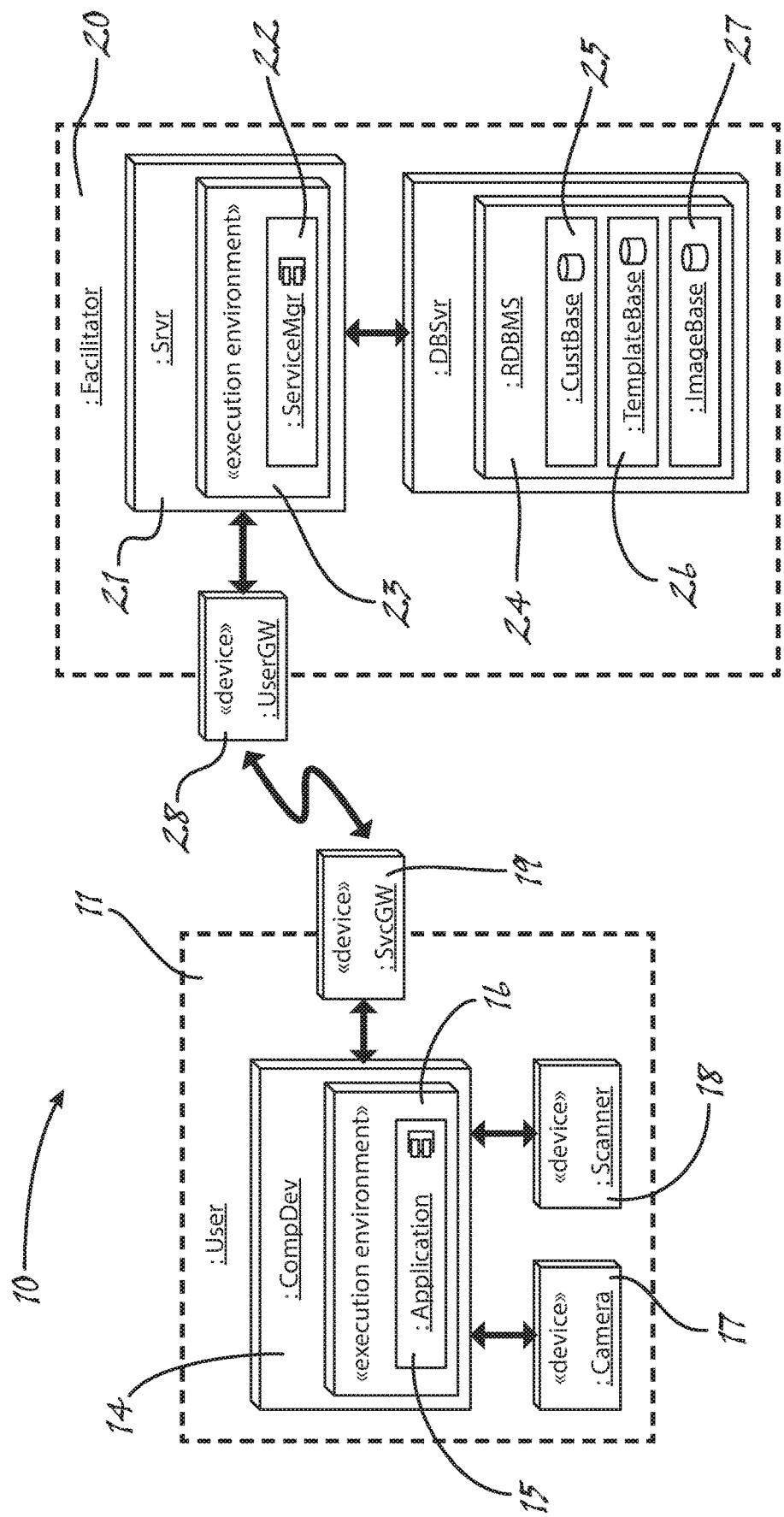
FIG. 1 shows, in a deployment diagram, a preferred implementation of the system for facilitating temporary employment in secure environments of the present invention.

As shown in the figures, and in FIG. 1 in particular, the distributed system 10 for facilitating temporary employment in secure environments, as implemented in accordance with the present invention, utilizes a computer server 21 located at a site associated with a facilitator 20 of temporary employment to bring together a prequalified pool of candidate employees 12 and set of employers 13 in particular need, from time-to-time of such temporary employees as possess credentials for which the employees 12 are prequalified, as set forth herein. For purposes of this exemplary disclosure, the employees 12 and the employers 13 are collectively referred to as users 11 of the distributed system 10.

In accordance with at least the most preferred implementations of the present invention, each candidate employee 12 is required to have only a minimal contractual relationship with the facilitator 20, which typically is the owner of the distributed system and related methods. In particular, a candidate employee user 12 of the implemented system 10 and methods preferably need not be in an employment type relationship with the facilitator 20. On the other hand, however, provision of the services requires that a candidate employee 12 has provided proof of professional credentials, including training and, as may be required, professional or other required licensing or the like, as will be better understood further herein. As also will be better understood herein, an employee user 12 of the implemented system 10 and methods is also required to submit to the collection by the facilitator 20 of one or more biometric markers for use in connection with the distributed system 10 of the present invention.

Likewise, participating employers 13 in need of credentialed temporary employees 12 need only meet minimal contractual requirements for effective utilization of the distributed system 10 of the present invention. In particular, as will be better understood further herein, each participating employer user 13 will typically be required to receive and hold confidential information regarding an employee 12, which may include medical records or like patient protected information, and in all cases will include at least one potentially legally protected biometric marker for each utilized employee 12. Additionally, each participating employer user 13 will typically need to be bound for payment of services, and may also be required, if desired by a particular facilitator 20, to execute appropriate agreements regarding confidentiality of employee lists and the like. Finally, and as will be described in greater detail further herein, each employer 13 will be required to maintain specified computing hardware and software, as will be necessary, in accordance with the present invention, for authentication of a selected employee's identity.

In any case, as particularly shown in FIG. 1, an exemplary computer server 21 as suitable for implementation, in accordance with the present invention, of the distributed system 10 for facilitating temporary employment, will host a service manager program 22 within an otherwise conventional execution environment 23. In order to efficiently and securely store and handle the various data required by the service manager program 22 in the provision of the services of the present invention, the server 21 also preferably hosts a database management system 24 or, in the alternative, is securely associated with a database management system 24 hosted, for example, on a dedicated database server. While, in light of this exemplary description, other data organization schemes will be readily within the ordinary skill in the relevant arts, a convenient and suitable model includes the provision, within the database management system 24, of a customer database 25 optimized for storing most information regarding individual employees 12 and employers 13, including their relationships with each other and the facilitator, qualifications, requirements, and the like. On the hand, more specialized information, as may require elevated security privileges and/or particular usage of particularly optimized filesystems or database field, may be stored in separate, but associated databases. In the exemplary implementation of the present invention as shown and described, a template database 26 is provided for maintaining biometric interchange data, and an image database 27 is provided for storing a preferably high quality facial image for each prequalified employee 12. Finally, a user gateway 28, such as an Internet connection and associated security appliances and the like, is implemented in connection with the computer server 21, and is made available for the use of the service manager program 22 in communicating with employee users 12, employer users 13, and, as will be better understood further herein, external resources 29 such as, for example, regulatory or licensing authorities, investigative agencies, financial services, payroll services, and the like.

Users 11 of the distributed system 10 of the present invention, including both employee users 12 and employer users 13, are required from time-to-time to access the service manager program 22 hosted on the server 21, and vice-versa. To this end, implementations of the distributed system 10 of the present invention include the provision of computing devices 14, which, may range from mobile communication devices to tablet computers to desktop computers, and the like. Most preferably, the various communications as will generally take place between the computer server 21 and either an employee 12 or an employer 13 should as much as possible utilize otherwise conventional means. That said, the implemented computing device 14 must minimally host a user application 15 for communication between the employee 12 or an employer 13 and the service manager program 22, 15 which application 15 may execute within an execution environment 16 conventionally provided within the computing device 14. As is otherwise conventional, the user application 15 is adapted to communicate through a service data gateway 19, such as a network interface device (Ethernet card or wireless transceiver), or mobile telephone transceiver, and which is typically provided with computing systems or mobile devices. As also shown in FIG. 1, the user application 15, whether configured for use of an employee 12 or an employer 13, communicates with the service manager program 22, and vice-versa, through the service data gateway 19 and the user gateway 28. In this manner, the service manager program 22 is readily adapted to securely utilize information from, and securely provide information to, the user application 15 for the facilitation of temporary employment services.

As previously noted, each employer 13 is be required to maintain specified computing hardware and software, as necessary for authentication of a selected employee's identity. To be sure, it is considered a critical aspect of the present invention that unlike ordinary temporary staffing agencies and the like the services made available through the distributed system 10 of the present invention enables the employer 13 to positively authenticate the identity of a selected employee 12 upon arrival of that employee 13 at the employer's location. To this end, the service manager program 22 is programmed and otherwise adapted to receive biometric data remotely obtained by the employer 13, to compare the received biometric data with biometric data previously obtained and validated by the facilitator 20, and securely stored in the template database 26 associated with the computer server 21, and to then communicate authentication or rejection to the employer 13. In this manner, a temporary employee 12 may be selected and brought on site by the employer 13 with mere hours or less notice of a vacancy in a shift, the selected employee 13 being positively associated with the required credentials through use of the distributed system 10.

In order for the employer 13 to capture the required biometric marker, however, the computing device 14 utilized by the employer 13 must have, or be associated with, a suitable biometric capture device, such as may comprise a camera 17, or like imaging device capable of photographing the face of the presenting employee 12, or a scanner 18, or like device capable of imaging the fingerprint, retina, or the like, depending on the particular implementation, of the presenting employee 12. In any case, any provided camera 17, scanner 18 or like device is made available for use of the user application 15.

Additionally, however, the most preferred implementations of the distributed system 10 of the present invention also includes a capability within the user application for converting the raw output from the camera 17 and/or scanner 18 into a more suitable format for electronic transmission and for processing by the service manager program 22. Whereas the user application 15 as deployed for use by an employee user 12 could be as simple as a web browser adapted to interface with a secure website hosted on the computer server 21, the user application 15 as deployed for use by an employee user 13 is most preferably a specialized application including functionality for utilizing a template format to convert the raw output from the camera 17 and/or scanner 18 into biometric interchange data.

As will be appreciated by those of ordinary skill in the relevant arts, the biometric data is most preferably converted to fingerprint template formats or face image template formats, or the like, as are well-known under various U.S. and international standards such as, for example, ANSI 378 (Finger Minutiae Format for Data Interchange), ANSI 385 (Face Recognition Format for Data Interchange), and ISO 19794 (Biometric Data Interchange Formats). These biometric interchange data formats produced are well known to provide efficiently transmitted data, and comparison algorithms for biometric markers presented in these formats are readily available.

In order to better understand the preferred methods of the present invention, an example of the utilization of the system is given with respect to FIG. 1. It should be appreciated, however, that the example now provided is exemplary only and an implementation within the scope of the present invention may include more or less than the described steps. That said, utilization will generally begin with a prospective employee 12 signing up for use of the services of the facilitator 20. According to the most preferred method of the present invention, this communication to take place through the user application 15, in which case the prospective employee 12 will use a computing device 14 as a user interface to communicate with the application 15, as required to provide all necessary personal and professional information as dictated by the position, and which information is stored in the customer base 25.

Once the employee 12 has requested service, the service manager program 22 on the computer server 21 will access external resources 29 to obtain and/or verify the employee's credentials and licensing status. If the prospective employee is qualified for use of the services, biometric markers, such as, for example a facial image or set of fingerprints, are obtained by the facilitator 20 and stored in the template base 25 and image base 27. Such markers as fingerprints may be utilized to further validate the employee 12 through additional background checks or the like, including checks to ensure the identity of the employee 12, who should for this part of the process appear in person at the facilitator's place of business. While storage of facial images in native formats, such as, for example, PNG, JPEG, BMP, GTF, RAW, within an image base 27 is not strictly necessary to the authentication process, such storage is advantageous to the extent that such images can be later transmitted to a hiring employer 13 for such purposes as initial identification upon arrival of the employee 12 at the employer's work site, and for advance preparation of security passes or the like. In any case, once an employee user 12 is accepted for use of the system, basic information such as, for example, qualifications, availability, pay rate, and the like is posted in a preferably secure location for access and review by employer users 13.

Figure 2:
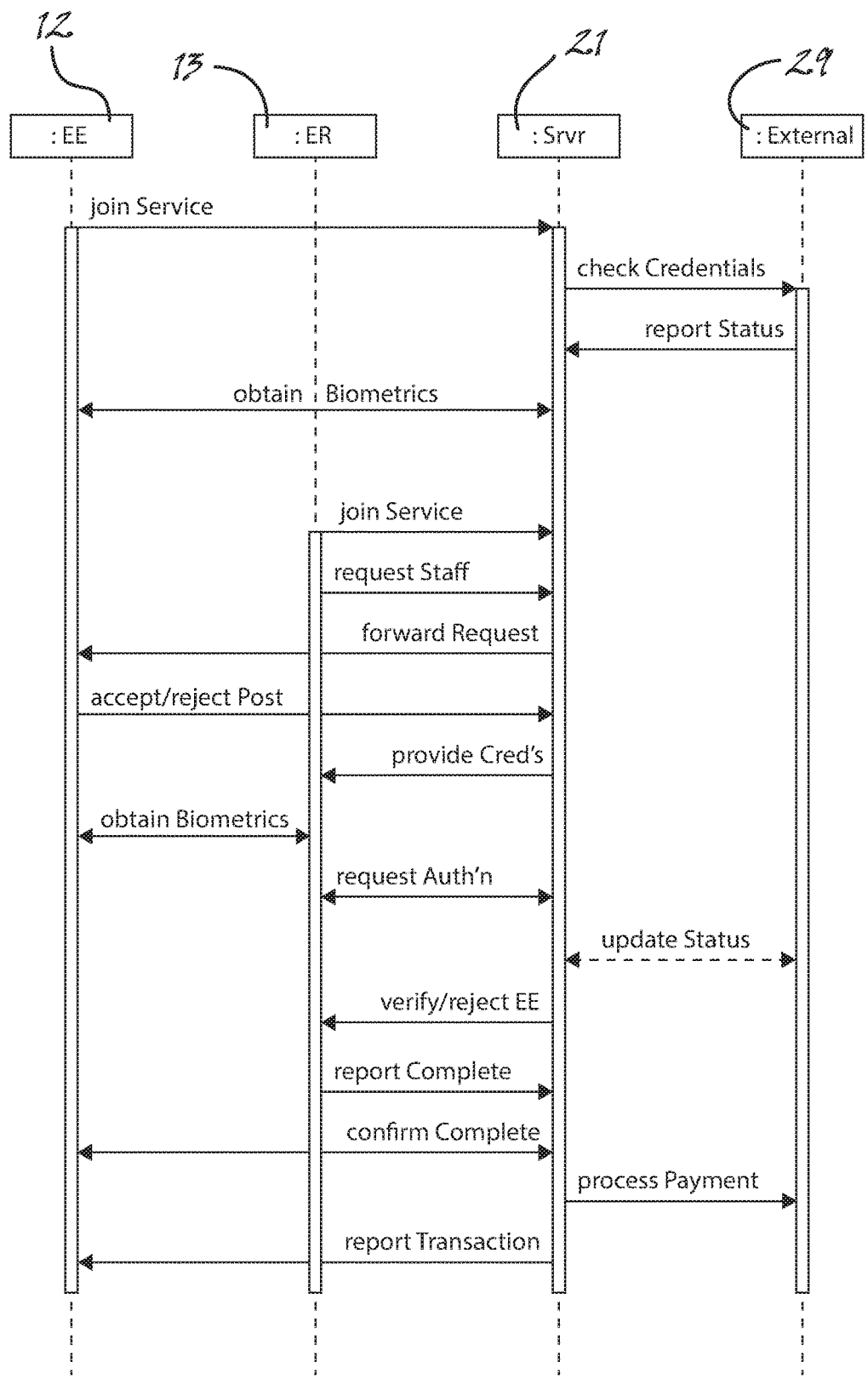
FIG. 2 shows, in a sequence diagram, various communications as may be made in a preferred method of use of the system for facilitating temporary employment in secure environments of FIG. 1.

As shown in FIG. 2, prospective employers 13 sign up for use of the services of the facilitator 20 by providing necessary identifying information and executing appropriate contractual and financial documents, all of which are preferably stored in the customer database 25. The accepted employer 13 is then provided with, or otherwise obtains, the necessary computing hardware and software to securely access the computer server 21, as well as to collect and process biometric markers. Once set up as described, the employer 13 then securely accesses the computer server 21 when a need for a qualified temporary employee 12 arises. Upon finding a suitable match, the employer 13 transmits a request for the selected employee 12, which request is forwarded by the server 21 to the identified employee 12, who may either accept or rejected the post.

Once an employee 12 accepts a post, the service manager program 22 operates to identify the necessary credentials for legal employment by the selecting employer 13, and securely transmits the required documentation to the employer 13, along with any other useful information, including, for example, a photograph of the employee 12 retrieved from the image database 27. The selecting employer 13 then need only wait for the arrival of the employee 12, at which point the employer 13 will obtain at least one biometric marker from the presenting employee 12. The obtained marker will preferably be converted into template format, and, in any case, will be transmitted to the service manager program 22 for authentication of the identity of the presenting employee 12. At this point, as shown in the figure, the most current status of the employee 12 may optionally be updated. If, however, the status utilized and the identity successfully validate, the employee 12 is set to work as agreed.

Upon completion of the posting, the employer 13 reports completion to the service manager program 22, along with any review or rating, if such provision is made in the particular implementation. The service manager program 22 then most preferably confirms with the employee 12 that the reported completion is accurate. In at least the most preferred implementations of the distributed system 10 of the present invention, the service manager program 22 further operates to bill for or even automatically obtain payment for services rendered, which will preferably include a premium for use of the service. In any case, the service manager program 22 reports the transaction to the employee 12 and should also arrange for or make payment to the employee 12.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. In any case, because the scope of the present invention is much broader than any particular embodiment, the foregoing detailed description should not be construed as a limitation of the scope of the present invention, which is limited only by the claims appended hereto.

What is claimed is:

1. A distributed system for facilitating temporary employment in secure environments, said distributed system comprising:
    a service manager program hosted on a centralized server under the control of a third-party facilitator of temporary employment of a prospective prequalified employee by an employer, said centralized server providing data storage and communication services to said service manager program;
    a plurality of remote computing devices, wherein each said computing device:

hosts an employer software application configured to provide electronic communication between an employer location and said third-party centralized server; and is provided with at least one associated biometric capture device; and wherein said service manager program is adapted to:

accept a request for employment service transmitted through said employer software application of a requesting employer;

provide documentation of credentials possessed by a selected prospective employee to said employer software application of said requesting employer;

receive and validate biometric data of a person purporting to be said selected prospective employee, said biometric data being generated by a said biometric capture device associated with said computing device of said requesting employer; and communicate verification or rejection of said biometric data of said person purporting to be said selected Prospective employee to said employer software application of said requesting employer.

2. The distributed system for facilitating temporary employment in secure environments as recited in claim 1, wherein at least one said associated biometric capture device comprises a fingerprint scanner.

3. The distributed system for facilitating temporary employment in secure environments as recited in claim 2, wherein at least one said associated biometric capture device comprises a camera.

4. The distributed system for facilitating temporary employment in secure environments as recited in claim 1, wherein at least one said associated biometric capture device comprises a camera.

5. The distributed system for facilitating temporary employment in secure environments as recited in claim 1, wherein said service manager program is further adapted to provide a photograph of said selected prospective employee to said employer software application of said requesting employer prior to said generation of said biometric data of said person purporting to be said selected prospective employee.

6. The distributed system for facilitating temporary employment in secure environments as recited in claim 1, wherein said request for employment service identities said selected prospective employee.

* * * * *